United States Patent [19]

Tigerholm

[11] Patent Number: 5,524,661

[45] Date of Patent: Jun. 11, 1996

[54] METHOD OF BLOCKING A PIPE AND DEVICE THEREFOR

[75] Inventor: Lars Tigerholm, Bromma, Sweden

[73] Assignee: Tigerholm AB, Ekerö, Sweden

[21] Appl. No.: 418,439

[22] Filed: Apr. 7, 1995

[30] Foreign Application Priority Data

Apr. 8, 1994 [SE] Sweden ................................ 9401189

[51] Int. Cl.6 .......................... F16K 43/00; F16L 55/132
[52] U.S. Cl. ............................. 137/15; 137/315; 137/318; 138/93; 138/94; 138/97
[58] Field of Search ........................ 73/49.8; 137/15, 137/315, 318, 317; 138/89, 93, 94, 97

[56] References Cited

U.S. PATENT DOCUMENTS

| | | | |
|---|---|---|---|
| 1,946,138 | 2/1934 | Gardner | 138/93 |
| 2,476,907 | 7/1949 | Preston et al. | 138/94 |
| 3,115,163 | 12/1963 | Van Epps et al. | 138/94 |
| 3,240,227 | 3/1966 | Burkholder | 137/318 |
| 3,842,864 | 10/1974 | Riegel et al. | 138/93 |
| 4,291,727 | 9/1981 | Yie et al. | 137/318 |
| 4,351,349 | 9/1982 | Minotti | 137/15 |
| 4,428,204 | 1/1984 | Brister | 138/93 |
| 4,458,721 | 7/1984 | Yie et al. | 137/318 |
| 4,505,295 | 3/1985 | Quin et al. | 137/315 |
| 4,627,470 | 12/1986 | Carruthers | 138/93 |
| 4,949,744 | 8/1990 | Heed et al. | 137/15 |
| 5,285,806 | 2/1994 | Ortega | 137/318 |
| 5,400,814 | 3/1995 | Tigerholm | 137/15 |

FOREIGN PATENT DOCUMENTS

| | | |
|---|---|---|
| 182332 | 3/1907 | Germany ................................ 138/93 |
| 3118731 | 12/1982 | Germany . |
| 2140894 | 12/1984 | United Kingdom . |
| 2270729 | 3/1994 | United Kingdom . |

*Primary Examiner*—George L. Walton
*Attorney, Agent, or Firm*—Walter Ottesen

[57] ABSTRACT

The invention relates to a method and a device for blocking fluid in a pipe 1 onto which a positioning unit 2 is hermetically mounted and through which a hole is drilled in the pipe while maintaining a hermetic seal. An expandable body 8 is inserted into the pipe with the aid of a blocking implement 7 enclosed in support tube 9. The expandable body is expanded to temporarily block the flow of fluid in the pipe. The support tube has a supporting structure for supporting the expandable body against the flow of fluid during insertion into the pipe, after insertion, during expansion and after expansion. The support structure increases the capability of the expanded body to withstand the high pressure of the fluid.

9 Claims, 4 Drawing Sheets

METHOD OF BLOCKING A PIPE AND DEVICE THEREFOR

FIELD OF THE INVENTION

The invention relates to method and a device for blocking a fluid in a pipe on which a hermetically sealed positioning unit is mounted and through which a hole is drilled in the pipe while the hermetic seal is maintained. This enables an expandable body to be inserted through the positioning unit with the aid of a blocking implement. The expandable body is passed through the drilled hole into the pipe and expanded for temporarily blocking the flow of fluid in the pipe.

BACKGROUND OF THE INVENTION

A method and a device for temporarily blocking the flow of fluid in a pressurized pipe while retaining a hermetic seal are set forth in U.S. Pat. Nos. 4,949,744 and 5,400,814 which are incorporated herein by reference. In the method and device shown in U.S. Pat. No. 5,400,814, an expandable body, in the form of a rubber balloon is introduced into the pipe and made to expand and block the pipe. The rubber balloon is only kept in place by friction against the inner wall surface of the pipe. This reduces the usefulness of the device when the fluid has a high pressure and when there are pressure surges in the pipe system. They could easily cause the rubber balloon to slide inside the pipe and ultimately burst. Moreover, the inner wall surface of welded pipes is not always smooth and can have welding seams with sharp burrs easily capable of damaging a slipping balloon and causing the balloon to burst.

SUMMARY OF THE INVENTION

It is an object of the invention to provide a method and a device which eliminate the above-mentioned disadvantages and allow the use of existing blocking methods at much higher pipe pressures than heretofore. It is another object of the invention to provide greater support for the expandable body thereby enabling the expandable body to withstand higher pipe pressures without collapsing.

In one embodiment of the invention, the above objects are achieved when a support tube is inserted through a positioning unit. The support tube encloses a blocking implement and its expandable body and has a lower portion which protrudes into the pipe. The lower portion forms a semicylinder whose opening faces toward the flow of fluid in the pipe. When fully inserted into the pipe, the lower portion of the support tube approaches the bottom of the pipe, that is, the lower portion of the inner wall surface of the pipe. In this position, the lower portion supports the expanded body so that the body does not depend on friction between it and the inner wall surface of the pipe to keep it in position inside the pipe against the pressure of the fluid. This is particularly important in the blocking of heating pipes because warm fluids tend to reduce friction between the pipe and the rubber balloon and is also important when blocking large diameter pipes in which the support tube permits greater expansion of the rubber balloon. In this way, a given rubber balloon size and even a given size for the hole drilled in the pipe can be used for a plurality of pipe diameters; that is, the required number of different sizes can be reduced. Practical trials have shown that the blocking method and device according to the invention are capable of withstanding pipe fluid pressures which are 3 to 5 times higher than in prior art blocking methods employing an expanded rubber balloon without lateral support.

In order to further enhance support for the expandable body, the lower part of the support tube can be configured so that it forms a semicylindrical rod with its flat side facing the direction of fluid flow in the pipe and so that it has flaps mounted on the flat side. The flaps automatically move outwardly as the support tube is lowered. The flaps are slidably mounted on the flat side of the rod. In a corresponding manner, the flaps retract in towards the center of the rod when they touch the inner surface of the upper inner wall surface of the pipe as the blocking implement is withdrawn from the pipe so as to permit passage through the hole drilled in the pipe.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
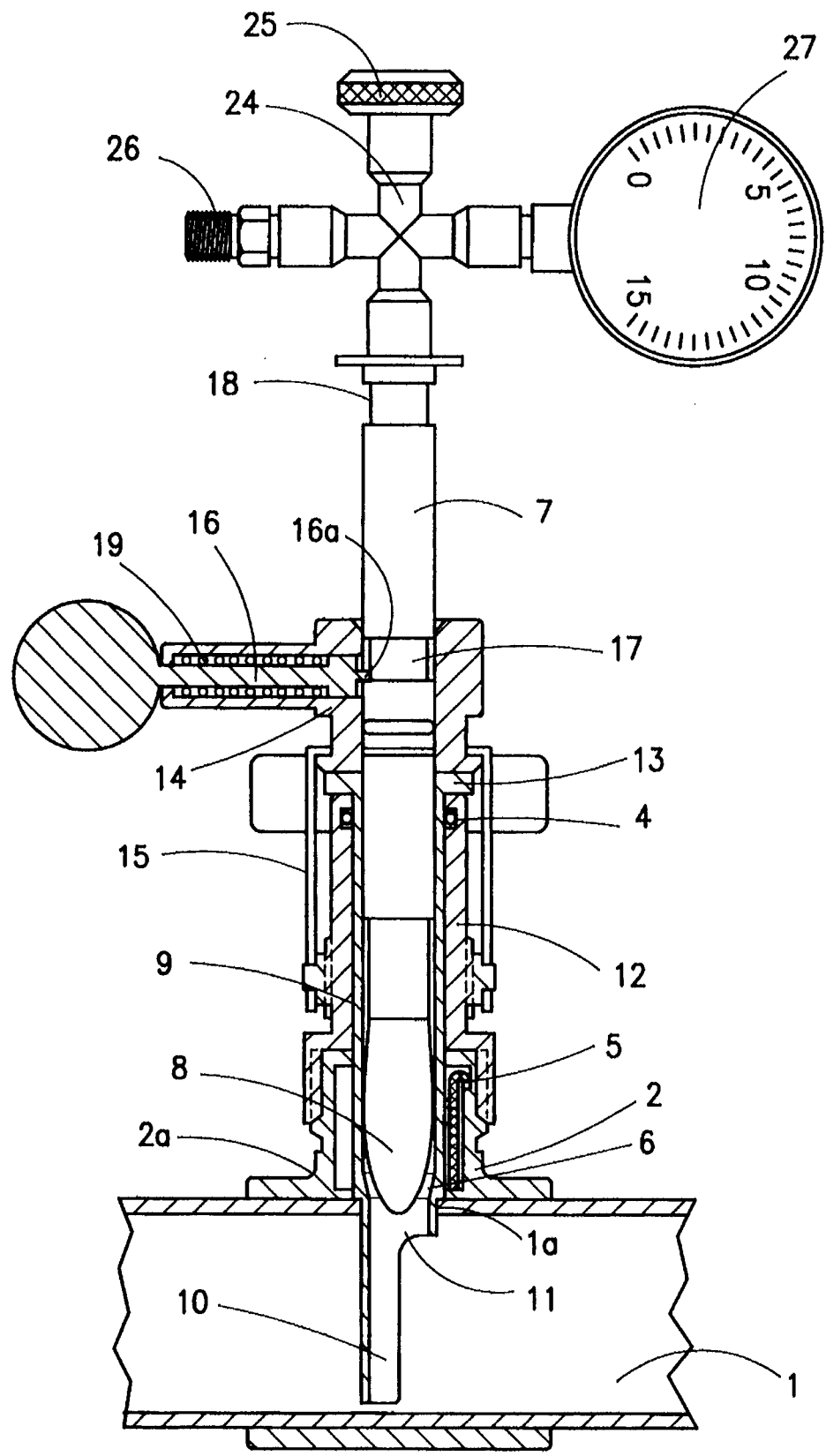
FIG. 1 is a side elevation view, partially in section, of a device according to the invention for blocking a fluid in a pipe with this view showing the support tube mounted inside the positioning unit and with the blocking implement in its upper position before the expandable body is inserted into the pipe to be blocked.

In FIG. 1, reference numeral 1 identifies the part of the pipe in which flow is to be blocked. A positioning unit 2 has a base 2a which is attached to the pipe with a threaded connector (not shown) so that a hermetic seal is achieved. Appropriate attachment means for attaching the base 2a to the pipe 1 are shown, for example, in U.S. Pat. No. 5,400,814 incorporated herein by reference. The positioning unit 2 is equipped with a valve device 5 in the form of a flap seal made of rubber which is actuated by inserting a drill or a thin-walled support tube 9. The positioning unit 2 further has an extension part 12 threadably connected to unit 2. At its uppermost end, the extension part 12 has an internal sealing body 4 to seal against a drill or the support tube 9. The extension part 12 is equipped with a rotatingly arranged locking clamp 15 which clamps a locking device 14 to the extension part. The locking device 14 comprises a locking cylinder 16 resiliently biased by spring 19. The locking cylinder 16 has a locking pin 16a which latches blocking implement 7 by engaging a notch 17 thereof when the support tube 9 is inside the extension part 12 and unit 2. The locking pin 16a engages the notch 18 after the blocking implement 7 is inserted further thereby inserting the expandable body 8 into the pipe 1.

The support tube 9 consists of a thin-walled tube which is vertically displaceable inside the extension part 12 and which is hermetically sealed by the sealing body 4. The support tube 9 has a collar 13 at the upper end thereof which fixes the support tube 9 in position relative to the extension part 12. The lower portion of the support tube 9, which protrudes into the pipe 1, is formed to define a support structure in the form of a semicylinder 10 having an opening 11 facing in the direction of fluid flow in the pipe. The semicylinder acts as a support for the expandable body, especially in the expanded state, during blocking of fluid flow in the pipe.

The blocking implement 7 with the expandable body 8 is inserted into the support tube 9. The locking pin 16a of locking device 14 engages the annular notch 17 in the blocking implement 7 when inside extension part 12. The locking device 14 is affixed to extension part 12 by the locking clamp 15. In this position, the lower part or semicylinder 10 of the support tube 9 is in its end position inside the pipe 1. The expandable body 8 is disposed within the internal space 6 of positioning unit 2 when locking pin 16a is engaged with notch 17.

Figure 2:
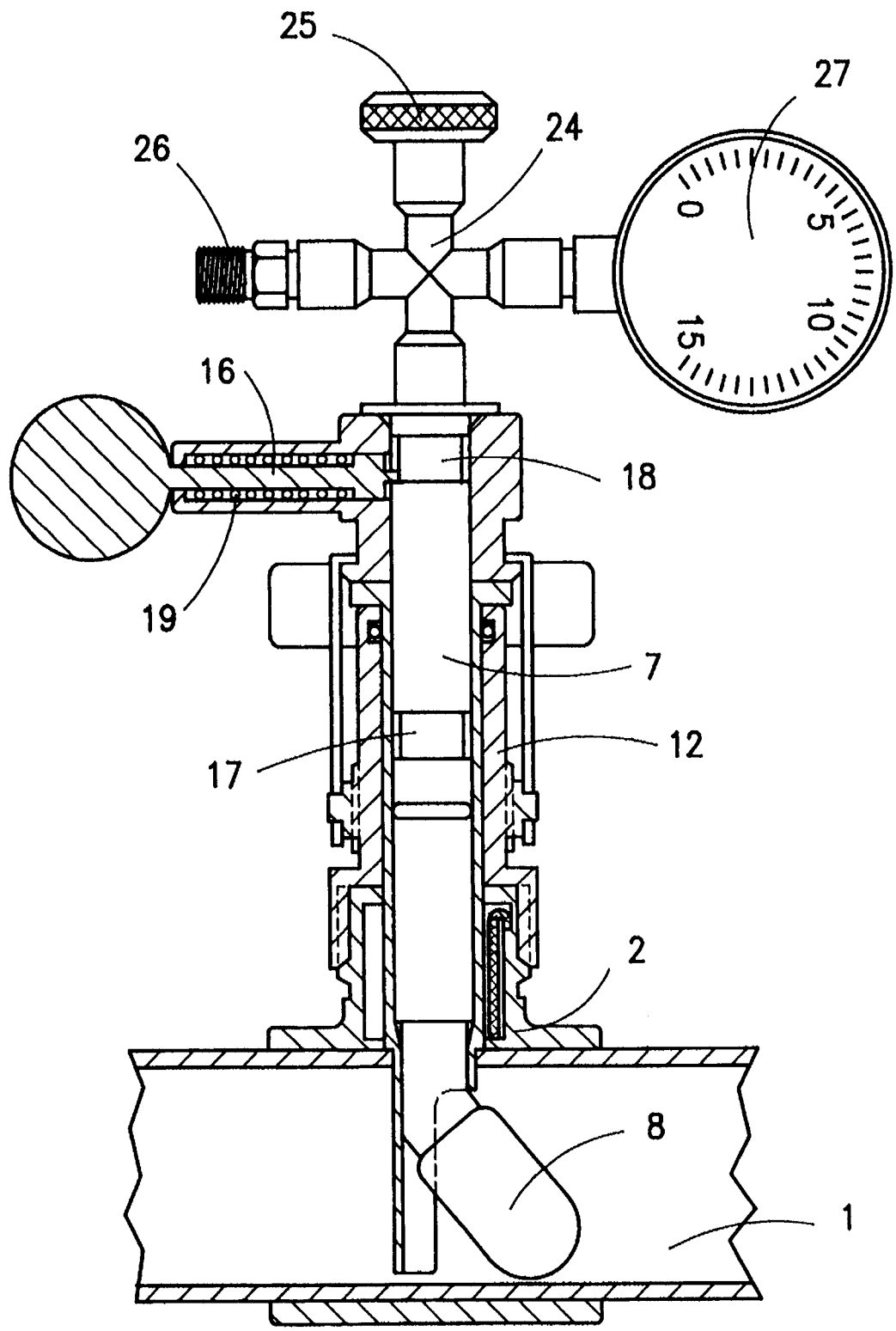
FIG. 2 shows the same side elevation view but after the expandable body has been inserted into the pipe.

FIG. 2 shows the position of the blocking implement 7 after the locking pin 16a of locking cylinder 16 has been disengaged from the notch 17, and the blocking implement with its expandable body has been pushed down into the pipe and locked in position when the locking pin 16a engages the annular notch 18. The upper end of the blocking implement 7 has a multiconnection fitting 24 with a plugged connection 25, a connection 26 for compressed air and a connection on which a pressure gauge 27 is mounted.

Figure 3:
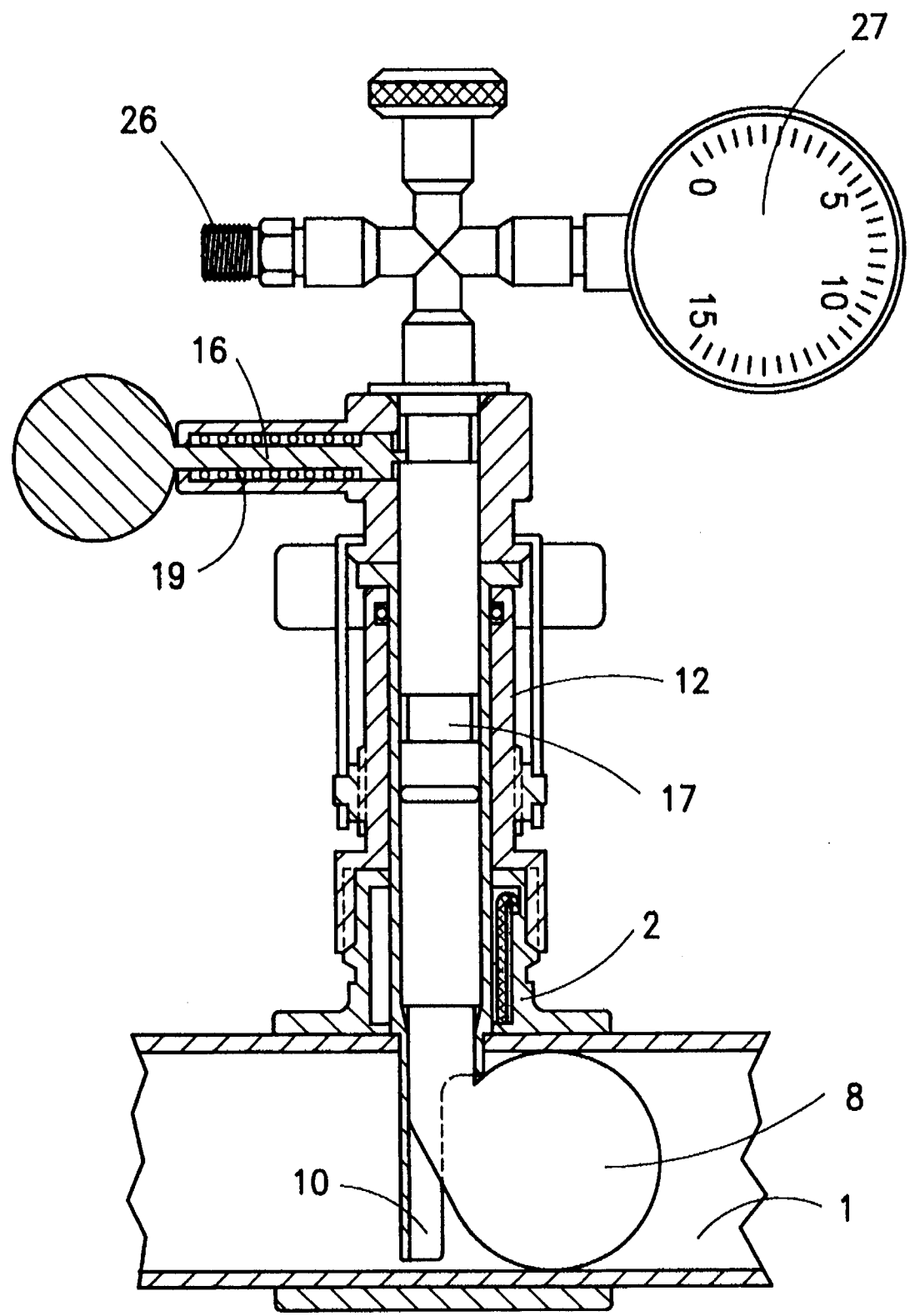
FIG. 3 also shows a side elevation view in which the expandable body has been expanded to block the pipe.

In FIG. 3, compressed air has been supplied through the connection 26 to expand the expandable body 8 until sufficient pressure has been achieved as shown on the pressure gauge 27. This blocks the pipe 1 so that work can be performed on the pipe at a location downstream of the location whereat the positioning unit 2 is attached to the pipe.

After work on the pipe 1 has been completed downstream of the location where the installation unit 2 has been installed, the blocking implement 7 is removed in a corresponding manner after blocking. The compressed air is evacuated through the connection 26. The blocking implement 7 is withdrawn until the locking cylinder 16 engages the notch 17. The support tube 9 with the blocking implement 7 is detached from the locking device 14 and withdrawn from the positioning unit 2. The valve flap 5 then automatically closes to prevent leakage of fluid from the pipe 1.

Thereafter, the extension part 12 is threadably disengaged from the base structure 2a and replaced by a simple threaded cap (not shown). The cap and base structure 2a then remain on the pipe 1 to serve as a permanent closure for the hole 1a.

Figure 4:
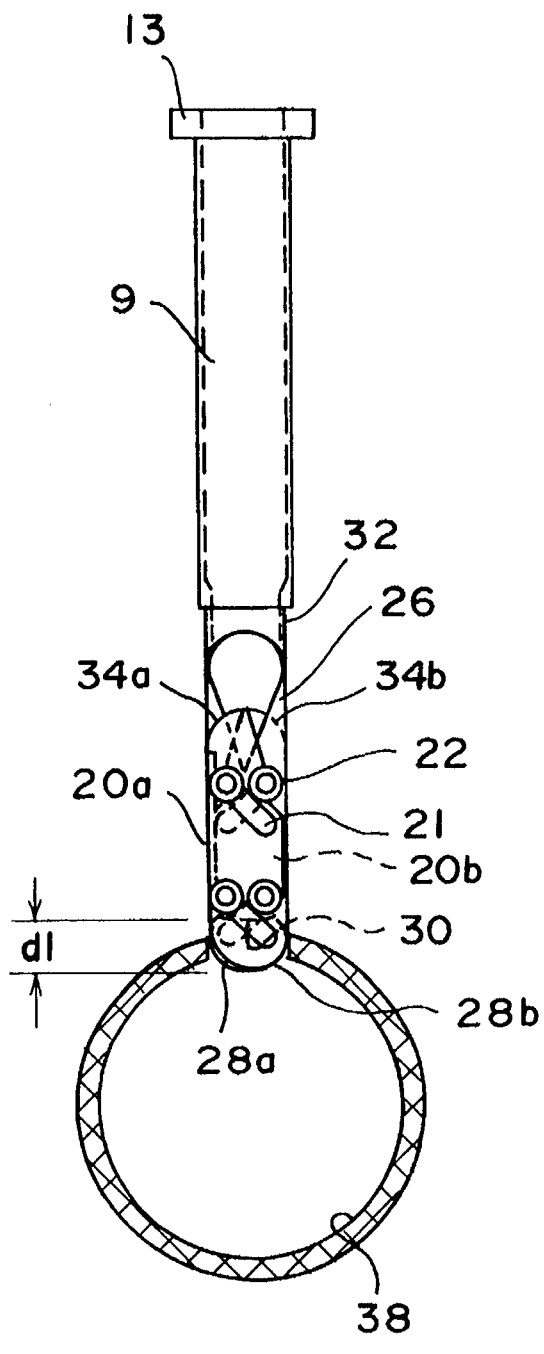
FIG. 4 is another embodiment of the invention wherein the support tube is provided with flaps with this view showing a front elevation of the support tube and the flaps before the tube is inserted into the pipe; and, FIG. 5 shows the support tube of FIG. 4 with the flaps displaced outwardly after the tube has been inserted into the pipe.

FIG. 4 shows a schematic cross section of the support tube 9 prior to insertion into the pipe 1. The support tube 9 is equipped with flaps 20a and 20b which are in a retracted position for the position of support tube 9 shown. The flaps (20a, 20b) are here shown overlapping each other with flap 20a atop flap 20b. The flaps (20a, 20b) are each slidingly attached to the flat side 26 of the end portion of support tube 9 by two pins 22 which slide in respective slots 21 formed in the flaps. The slots 21 extend at an angle of 45° to the horizontal. Each of the pins 22 has a head for retaining the flap on the flat side 26.

In the overlapped position shown in FIG. 4, the lower rounded edge (28a or 28b) of each flap extends downwardly beyond the lower edge 30 of the end portion 32 of the support tube 9 by a first distance d1. Each flap has outer upper rounded edges (34a or 34b) in addition to outer lower rounded edges (28a or 28b).

Figure 5:
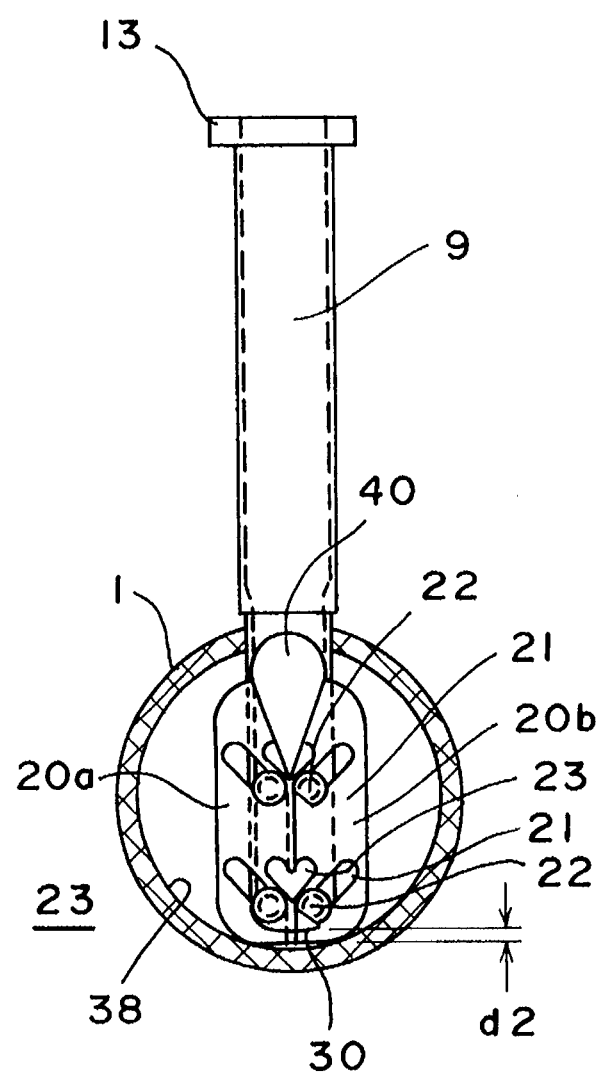

When the support tube 9 is lowered to the position shown in FIG. 5, the lower rounded edges (28a or 28b) of each plate strike the inner wall surface 38 of the pipe thereby causing the flaps to move upward relative to the end portion 32 of the support tube 9. This reduces the distance between the lower rounded edges (28a or 28b) and the lower edge 30 of the support tube 9 to a distance d2 as shown in FIG. 5. Thus, the downward movement of the support tube 9 causes the flaps (20a, 20b) to move apart and the flaps increase the overall area of support available for the expandable body 8. The flaps (20a, 20b) are guided in their outward movement by the coaction of the slots 21 and holding pins 22. In a like manner, the flaps (20a, 20b) are pushed together so that they again overlap when the support tube 9 is withdrawn. In this movement, the outer upper rounded edges (34a or 34b) of each flap (20a or 20b) come into contact engagement with the inner wall surface 38 of the pipe thereby causing the flaps to again move along slots 21 until the flaps (20a, 20b) occupy the position shown in FIG. 4. Each flap is provided with two cutouts 23 to allow the flap to pass the holding pins of the other flap as they move into the overlapped position shown in FIG. 4.

Reference numeral 40 identifies the opening in the support tube 9 through which the blocking implement passes the expandable body out of the support tube and into the pipe.

The invention is not limited to the embodiments illustrated but can comprise other solutions wherein the end portion of the support section is widened, for example, with the aid of openable wings or hinged flaps.

It is understood that the foregoing description is that of the preferred embodiments of the invention and that various changes and modifications may be made thereto without departing from the spirit and scope of the invention as defined in the appended claims.

What is claimed is:

1. A device for temporarily blocking the flow or fluid under pressure through a pipe having an annular wall defining an outer wall surface and an inner wall surface defining an inner pipe diameter, the device comprising:

a positioning unit including: a base structure defining a through channel and communicating with the outer surface of the pipe; the base structure further defining an opening to said channel, whereby a tool can be inserted into said channel for making a hole in the wall of the pipe; attachment means for attaching said base structure to said pipe so as to provide a seal between said base structure and the outer surface of the pipe; and, sealing means for sealing said channel with respect to the ambient when the tool is inserted;

a blocking unit including: a support tube sealingly disposed in said channel against said sealing means and having a support structure at its lower end for extending substantially into the pipe after the hole is made therein; said support structure defining a support surface extending along the entire length thereof, said support surface facing the flow of fluid in the pipe when said support structure is disposed in the pipe so as to extend over substantially the entire inner diameter of the pipe; a holder having a lower end; an expandable body mounted on said lower end; and, said holder being movably mounted in said support tube so as to permit insertion of said expandable body into the pipe upstream of said support surface;

means for expanding said expandable body when said expandable body is in the pipe so as to provide an expanded body blocking the pipe;

said support structure being directly behind said expandable body and supporting substantially the entire length of said expandable body when said expandable body is in the pipe so as to permit said support surface to support said expandable body against the force of the fluid acting on said expandable body before expansion, during expansion of said expandable body and after expansion thereof, so that said fluid force acting on the expanded expandable body forces a rear portion thereof against said support structure thereby increasing the sealing pressure between the inner wall surface of said pipe and a peripheral expanded portion of said expanded expandable body to keep said expanded expandable body in position inside said pipe against the pressure of the fluid thereby preventing displacement of said expanded expandable body relative to Said positioning unit and said tubular support; and, said positioning unit further including valve means movable between a first position wherein said channel is closed to the ambient and a second position wherein said channel is open to permit insertion of support tube and said holder with said expandable body into said pipe.

2. The device of claim 1, said positioning unit further comprising:

an extension section mounted on said base structure and having a channel formed therein for communicating with said channel of said base structure;

said support tube being a thin-walled tube vertically displaceable in said channels and said thin-walled tube having a collar formed thereon at its upper end for fixing said support tube in position relative to said extension section;

said support structure defining a semicylinder having an opening facing toward said flow of fluid and said semicylinder having an inner wall surface defining said opening and said support surface; and, said sealing means being mounted in said extension section for also sealing said support tube when the latter is inserted into said positioning unit.

3. The device of claim 2, further comprising:

a locking device mounted to hold said support tube in position relative to said positioning unit when said support tube is inserted into said positioning unit; and, clamping means for clamping said locking device to said extension section.

4. The device of claim 3, said holder being an elongated member defining a longitudinal axis; said locking device comprising:

first and second latch recesses formed in said holder at respective locations along said axis;

a lock housing clamped to said extension section by said clamping means;

a locking cylinder mounted in said lock housing so as to be movable between a release position wherein said holder can be freely moved in said support tube and a latch position wherein said locking cylinder engages said first recess to fix said holder in a first position wherein said expandable body is outside of the pipe or engages said second recess to fix said holder in a second position wherein said expandable body is in said pipe directly forward of said support structure; and, resilient biasing means for biasing said locking cylinder into said latch position.

5. The device of claim 1, wherein said support structure has a lower tip which is in close proximity to the lower portion of said inner wall surface of said pipe when said support structure is in said pipe.

6. A device for temporarily blocking the flow of fluid under pressure through a pipe having an annular wall defining an outer wall surface and an inner wall surface, the device comprising:

a positioning unit including: a base structure defining a through channel and communicating with the outer surface of the pipe; the base structure further defining an opening to said channel, whereby a tool can be inserted into said channel for making a hole in the wall of the pipe; attachment means for attaching said base structure to said pipe so as to provide a seal between said base structure and the outer surface of the pipe; and sealing means for sealing said channel with respect to the ambient when the tool is inserted;

a blocking unit including: a support tube disposed in said channel and having a support structure at its lower end for extending at least partially into the pipe after the hole is made therein; said support structure defining a support surface facing the flow of fluid in the pipe when said support structure is in the pipe; a holder having a lower end; an expandable body mounted on said lower end; and, said holder being movably mounted in said support tube so as to permit insertion of said expandable body into the pipe upstream of said Support surface;

means for expanding said expandable body when said expandable body is in the pipe so as to provide an expanded body blocking the pipe;

said support structure being directly behind said expandable body when said expandable body is in the pipe so as to permit said support surface to support said expandable body against the force of the fluid before expansion, during expansion and after being expanded so that said body does not depend on friction between it and said inner wall surface of said pipe o keep it in position inside said pipe against the pressure of the fluid thereby preventing displacement of the expanded body relative to said positioning unit and said tubular support; and, said positioning unit further including valve means movable between a first position wherein said channel is closed to the ambient and a second position wherein said channel is open to permit insertion of he tool and said holder with said expandable body;

said support tube defining a longitudinal axis;

said support structure including an extension of said support tube tapered to define a semicylinder having a flat surface facing said flow of fluid; two flaps mounted on said flat surface so as to slide transversely to said axis between a retracted position wherein said flaps define a first area facing into said flow and an extended position wherein said flaps define said support surface as having an area greater than said first area; guide means for guiding said flaps between said retracted position and said extended position;

said flaps having lateral lower edges which come into contact engagement with said inner wall surface of said pipe when said support structure is lowered into said pipe thereby pushing said flaps into said extended position; and, said flaps having lateral upper edges which come into contact engagement with said inner wall surface of said pipe when said support structure is withdrawn from within said pipe thereby pushing said flaps into said retracted position.

7. The device of claim 6, said guide means comprising two slots formed in each of said flaps at an angle of approximately 45° with respect to said axis; two-headed pins mounted in said semicylinder for each of said flaps for engaging corresponding ones of said slots; and, said flaps being overlapped when in said retracted position and each of said flaps having cutouts for receiving corresponding ones of said pins of the other flap when in said retracted position.

8. The device of claim 7, said extension having a lower end and said flaps extending beyond said lower end a first distance (d1) when said flaps are in said retracted position; each of said slots defining a second distance (d2) measured in elevation vertically in the direction of said axis; and, said first distance (d1) being greater than said second distance (d2).

9. A method for temporarily blocking the flow of fluid under pressure through a pipe ring repair work thereon, said pipe having an annular wall defining an outer wall surface and an inner wall surface defining an inner pipe diameter, the method comprising the steps of:

- fixedly attaching a base structure defining a through channel and communicating with the outer surface of the pipe;
- providing a hole in the annular wall of the pipe;
- providing a normally closed valve in the base structure for closing the channel;
- providing a seal in said channel for sealing the channel with respect to the ambient;
- providing a support tube having a support structure at its lower end and said support structure having a support surface extending along the entire length thereof;
- inserting said support tube in sealing contact with said seal through said channel and into said hole so as to cause said support structure to extend over substantially the entire inner diameter of the pipe with said support surface facing the flow of fluid;
- providing a holder having a lower end and an expandable body mounted on said lower end;
- inserting said holder into said support tube so as to place said expandable body directly forward of said support surface;
- expanding said expandable body so as to provide an expanded body blocking the pipe with said body being supported by said support surface of said support structure against the force of the fluid acting on said expandable body before expansion, during expansion of said expandable body and after expansion thereof, so that said fluid force acting on the expanded expandable body forces a rear portion thereof against said support structure thereby increasing the sealing pressure between the inner wall surface of said pipe and a peripheral expanded portion of said expanded expandable body to keep said expanded expandable body in position inside said pipe against the pressure of the fluid thereby preventing displacement of said expanded expandable body relative to the hole in the pipe;
- deflating said expandable body and withdrawing said holder from said support tube; and,
- withdrawing said support tube from said hole and said channel thereby allowing said valve to return to the normally closed position wherein said channel is closed with respect to the ambient.

* * * * *

UNITED STATES PATENT AND TRADEMARK OFFICE
CERTIFICATE OF CORRECTION

PATENT NO. : 5,524,661

DATED : June 11, 1996

INVENTOR(S) : Lars Tigerholm

It is certified that error appears in the above-identified patent and that said Letters Patent is hereby corrected as shown below:

In column 5, line 14: delete "Said" and substitute -- said -- therefor.

In column 5, line 19: between "of" and "support" insert -- said --.

In column 6, line 25: delete "Support" and substitute -- support -- therefor.

In column 6, line 36: delete "o" and substitute -- to -- therefor.

In column 6, line 44: delete "he" and substitute -- the -- therefor.

UNITED STATES PATENT AND TRADEMARK OFFICE
CERTIFICATE OF CORRECTION

PATENT NO. : 5,524,661
DATED : June 11, 1996
INVENTOR(S) : Lars Tigerholm

It is certified that error appears in the above-indentified patent and that said Letters Patent is hereby corrected as shown below:

In column 6, line 47: delete "including" and substitute -- including: -- therefor.

In column 7, line 17: delete "ring" and substitute -- during -- therefor.

Signed and Sealed this

Twenty-fourth Day of September, 1996

Attest:

BRUCE LEHMAN

*Attesting Officer*      *Commissioner of Patents and Trademarks*